United States Patent
Guo et al.

(10) Patent No.: US 12,484,493 B2
(45) Date of Patent: Dec. 2, 2025

(54) PERFORATING, OXYGENATING AND WATER INJECTION INTEGRATED APPARATUS FOR MUSHROOM STICKS OF EDIBLE MUSHROOMS AND WORKING METHOD THEREOF

(71) Applicant: SHANDONG ACADEMY OF AGRICULTURAL MACHINERY SCIENCES, Shandong (CN)

(72) Inventors: Hongen Guo, Jinan (CN); Qinghai He, Jinan (CN); Jing Zhao, Jinan (CN); Youhui Chu, Jinan (CN); Yinnan Li, Jinan (CN); Junlin Li, Jinan (CN); Wenjing Nie, Jinan (CN); Bo Liu, Jinan (CN)

(73) Assignee: SHANDONG ACADEMY OF AGRICULTURAL MACHINERY SCIENCES, Jinan (CN)

( * ) Notice: Subject to any disclaimer, the term of this patent is extended or adjusted under 35 U.S.C. 154(b) by 0 days.

(21) Appl. No.: 18/026,272

(22) PCT Filed: Jul. 28, 2022

(86) PCT No.: PCT/CN2022/108696
§ 371 (c)(1),
(2) Date: Mar. 14, 2023

(87) PCT Pub. No.: WO2023/071341
PCT Pub. Date: May 4, 2023

(65) Prior Publication Data
US 2024/0315179 A1  Sep. 26, 2024

(30) Foreign Application Priority Data
Oct. 29, 2021 (CN) .......................... 202111273443.4

(51) Int. Cl.
*A01G 18/60* (2018.01)

(52) U.S. Cl.
CPC ................................ *A01G 18/60* (2018.02)

(58) Field of Classification Search
None
See application file for complete search history.

(56) References Cited

U.S. PATENT DOCUMENTS

| | | | |
|---|---|---|---|
| 2019/0246571 A1* | 8/2019 | Ingram-Tedd | A01G 9/14 |
| 2021/0037722 A1* | 2/2021 | Hall | A01G 18/22 |
| 2023/0312302 A1* | 10/2023 | Bolard | B65H 75/36 |

FOREIGN PATENT DOCUMENTS

| | | |
|---|---|---|
| CN | 205093217 U | 3/2016 |
| CN | 108739070 A | 11/2018 |

(Continued)

OTHER PUBLICATIONS

Nov. 2, 2022 International Search Report issued in Patent Application No. PCT/CN2022/108696.
(Continued)

*Primary Examiner* — Joshua J Michener
*Assistant Examiner* — Henry Hooper Mudd
(74) *Attorney, Agent, or Firm* — Oliff PLC (57) ABSTRACT

A perforating, oxygenating and water injection integrated apparatus for mushroom sticks of edible mushrooms includes a support component that can realize lifting motion; a perforating, oxygenating and water injection component includes a needle head fastener, the needle head fastener is connected to the support component via lifting pieces, a plurality of hollow needle heads are fastened to the needle head fastener, and the needle heads are respectively in communication with a water supply pipeline and an oxygen supply pipeline; mushroom stick support frames are installed on the support component, and can expand and contract relative to the support component; the mushroom stick support frames are located below the perforating, oxygenating and water injection component; and mushroom (Continued)

stick grabbing components are fastened to the support component, and includes grabbing mechanisms that grab the mushroom sticks to the mushroom stick support frames and then release.

9 Claims, 3 Drawing Sheets

(56) References Cited

FOREIGN PATENT DOCUMENTS

| | | | |
|---|---|---|---|
| CN | 108739070 A1 * | 11/2018 | ............ A01G 18/60 |
| CN | 108739071 A | 11/2018 | |
| CN | 210247770 U | 4/2020 | |
| CN | 114145183 A | 3/2022 | |
| JP | 2010-029180 A | 2/2010 | |
| JP | 2012-254066 A | 12/2012 | |

OTHER PUBLICATIONS

Nov. 2, 2022 Written Opinion of the International Searching Authority issued in Patent Application No. PCT/CN2022/108696.

* cited by examiner

PERFORATING, OXYGENATING AND WATER INJECTION INTEGRATED APPARATUS FOR MUSHROOM STICKS OF EDIBLE MUSHROOMS AND WORKING METHOD THEREOF

CROSS-REFERENCE TO RELATED APPLICATIONS

The present disclosure claims priority to Chinese Patent Application No. 202111273443.4, filed with the Chinese Patent Office on Oct. 29, 2021 and entitled "Perforating, oxygenating and water injection integrated apparatus for mushroom sticks of edible mushrooms and working method thereof", which is incorporated herein by reference in its entirety.

TECHNICAL FIELD

The present disclosure relates to the field of edible mushrooms, and in particular relates to a perforating, oxygenating and water injection integrated apparatus for mushroom sticks of edible mushrooms, and a working method thereof.

BACKGROUND

The description in this section merely provides background information related to the present disclosure and does not necessarily constitute the prior art.

In recent years, the demand for edible mushrooms has been increasing, and production of mushrooms in intelligent factories is trending. During cultivation of edible mushrooms, oxygen and moisture are essential.

The inventor has found that a perforating and oxygenating device, which is put into use at the present, can only supply oxygen to mushroom sticks without water injection. Water injection after perforating of the mushroom sticks will inevitably increase production cost, resulting in high cost of edible mushrooms, low efficiency and relatively high labor intensity.

SUMMARY

Aiming at the defects in the prior art, the present disclosure provides a perforating, oxygenating and water injection integrated apparatus for mushroom sticks of edible mushrooms, which has the functions of perforating, oxygenating and water injection, and a movable support component is installed therein, and cooperates with mushroom stick support frames to realize operation on the mushroom sticks.

In order to achieve the above objective, the present disclosure is implemented through the following technical solution:

A perforating, oxygenating and water injection integrated apparatus for mushroom sticks of edible mushrooms, includes:
- a support component, the support component being capable of realizing lifting motion;
- a perforating, oxygenating and water injection component, installed on the support component, where the perforating, oxygenating and water injection component includes a needle head fastener, the needle head fastener is connected to the support component via lifting pieces, a plurality of hollow needle heads are fastened to the needle head fastener, and the needle heads are respectively in communication with a water supply pipeline and an oxygen supply pipeline;
- mushroom stick support frames, installed on the support component, where the mushroom stick support frames can expand and contract relative to the support component; and
- mushroom stick grabbing components, fastened to the support component, where the mushroom stick grabbing component includes a grabbing mechanism, and the grabbing mechanism releases after grabbing the mushroom stick to the mushroom stick support frame.

In the above-mentioned apparatus, the support component can move to a mushroom stick shelf, and the support component can move up and down, and can drive the perforating, oxygenating and water injection component and the like installed thereon to move together to each layer of the mushroom stick shelf. The mushroom stick grabbing components grab the mushroom sticks from the mushroom stick shelf to the mushroom stick support frames. The mushroom stick support frames are configured to support the mushroom sticks during the process of perforating the mushroom sticks. The perforating, oxygenating and water injection component performs perforating, oxygenating and water injection on each layer of mushroom sticks, thereby effectively improving work efficiency and controlling production cost.

According to the above-mentioned perforating, oxygenating and water injection integrated apparatus for mushroom sticks of edible mushrooms, the support component is installed on a fastening frame via sliding rails, the support component is connected to a lifting mechanism, the lifting mechanism drives the support component to realize lifting motion, and the lifting mechanism is fastened to the fastening frame.

Wheels are installed at the bottom end of the fastening frame, and the wheels cooperate with tracks fastened on the ground to move along the tracks. Under the driving of the fastening frame, the support component can move to the mushroom stick shelf, and it ensures that the support component can realize the lifting motion.

According to the above-mentioned perforating, oxygenating and water injection integrated apparatus for mushroom sticks of edible mushrooms, the needle head fastener is a needle head fastening plate.

The lifting piece is an electric telescoping sleeve, one end of the electric telescoping sleeve is connected to the support component, and the other end is connected to the needle head fastening plate.

According to the above-mentioned perforating, oxygenating and water injection integrated apparatus for mushroom sticks of edible mushrooms, the grabbing mechanism includes a telescoping shaft, a disc is fastened to one end of the telescoping shaft, clamping grooves are respectively provided on two sides of the disc, a clamping block that can move along the clamping groove is arranged at each clamping groove, the clamping blocks are connected to a driving power source, the driving power source drives the two clamping blocks to realize motion in the same direction or opposite directions, and thus the two clamping blocks clamp or release the mushroom stick.

According to the above-mentioned perforating, oxygenating and water injection integrated apparatus for mushroom sticks of edible mushrooms, considering that one mushroom stick needs 4-6 times of perforating, oxygenating and water injection, the telescoping shaft is connected to a rotation power source to drive rotation of the disc, and drive rotation of the grabbing mechanism, to realize rotation of the mushroom stick on the support component, facilitating uniformity of perforating, oxygenating and water injection, reducing work intensity, and improving the automation level of mushroom stick cultivation.

The telescoping shaft is an electric telescoping shaft, and due to arrangement of the telescoping shaft, the grabbing mechanism can move towards the support component.

According to the above-mentioned perforating, oxygenating and water injection integrated apparatus for mushroom sticks of edible mushrooms, the mushroom stick grabbing component is arranged above the mushroom stick support frame, and the mushroom stick grabbing component is arranged below the perforating, oxygenating and water injection component.

According to the above-mentioned perforating, oxygenating and water injection integrated apparatus for mushroom sticks of edible mushrooms, the mushroom stick support frame includes two telescoping sleeves, the two sleeves are spaced from each other by a set distance, the sleeves respectively are electric telescoping sleeves, and thus support to the mushroom stick is realized via the two sleeves, that is, two sleeves are arranged below each mushroom stick grabbing component.

According to the above-mentioned perforating, oxygenating and water injection integrated apparatus for mushroom sticks of edible mushrooms, there are the plurality of perforating, oxygenating and water injection components, and the position of the perforating, oxygenating and water injection components correspond to the positions of the mushroom stick grabbing components and the positions of the mushroom stick support frames, thereby realizing simultaneous operation on the plurality of mushroom sticks on the same layer of the mushroom stick shelf.

According to the above-mentioned perforating, oxygenating and water injection integrated apparatus for mushroom sticks of edible mushrooms, a control component is further included, and the control component is separately connected to the perforating, oxygenating and water injection component, the lifting pieces, the mushroom stick support frames and the mushroom stick grabbing components.

In a second aspect, the present disclosure further provides a working method of a perforating, oxygenating and water injection integrated apparatus for mushroom sticks of edible mushrooms, including:
- moving a support component to a mushroom stick shelf;
- expanding mushroom stick support frames towards the mushroom stick shelf by a set distance;
- grabbing, by grabbing mechanisms of mushroom stick grabbing components, the mushroom sticks from the mushroom stick shelf, and moving the mushroom sticks to the upper sides of the mushroom stick support frames, and the grabbing mechanisms releasing the mushroom sticks so that the mushroom sticks fall and are supported by the mushroom stick support frame;
- contracting the mushroom stick support frames; and
- under the driving of lifting pieces, a perforating, oxygenating and water injection component driving needle heads to enter the mushroom sticks, to perform water injection on the mushroom sticks and to perform oxygenating after water injection, after oxygenating is completed, the lifting pieces driving the needle heads to leave the mushroom sticks.

The present disclosure has the following beneficial effects.
1) According to the overall structure of the present disclosure, the support component can move up and down, and can drive the perforating, oxygenating and water injection component and the like installed thereon to move together to each layer of the mushroom stick shelf, to perform operation on the mushroom sticks on the different layers of the mushroom stick shelf, thereby realizing operation on the multiple layers of the shelf, realizing perforating as well as oxygenating and water injection, and improving operation efficiency of mushroom stick cultivation.
2) According to the present disclosure, the mushroom stick grabbing components grab the mushroom sticks from the mushroom stick shelf to the mushroom stick support frames, the mushroom stick support frames are configured to support the mushroom sticks during the process of perforating the mushroom sticks, and the perforating, oxygenating and water injection component is configured to perform perforating, oxygenating and water injection on each layer of mushroom sticks, thereby effectively improving work efficiency, controlling production cost and fully reducing labor cost.
3) According to the present disclosure, due to arrangement of the fastening frame, the support component can be driven to move to the mushroom stick shelf, and it ensures that the support component can realize lifting motion.
4) According to the present disclosure, through rotation of the grabbing mechanisms, rotation of the mushroom sticks on the support component is realized, and perforating, oxygenating and water injection are performed after rotation; after performing perforating, oxygenating and water injection once on the mushroom sticks on the telescoping support frames, the mushroom sticks need to be rotated to next positions for operation once more, thereby facilitating uniformity of perforating, oxygenating and water injection, reducing work intensity, and improving the automatic level of mushroom stick cultivation.

BRIEF DESCRIPTION OF THE DRAWINGS

A part of appended drawings forming the present disclosure illustrated herein are intended to provide further understanding of the present disclosure, and schematic embodiments of this disclosure and their descriptions are intended to explain the disclosure and do not constitute undue qualification of the disclosure.

In the figures: the distance or size between each other is enlarged to show the position of each component, and the diagram is only for illustration.

In the figures: 1, mushroom stick shelf; 2, support component; 3, fastening frame; 4, mushroom stick support frame; 5, water storage tank; 6, air storage tank; 7, wheel; 8, electric telescoping sleeve; 9, needle head fastener; 10, needle head; 11, oxygen supply pipeline interface; 12, water supply pipeline interface; 13, sliding rail; 14, control box; 15, mushroom stick grabbing component; 16, disc; 17, clamping block; 18, telescoping shaft; 19, mushroom stick grabbing component support frame; 20, sleeve.

DETAILED DESCRIPTION

It should be noted that, the following detailed descriptions are exemplary, and are intended to provide a further description to this disclosure. Unless otherwise defined, all technical and scientific terms used herein have the same meanings as commonly understood by a person of ordinary skill in the field to which this disclosure belongs.

It should be noted that terms used herein are only for the purpose of describing specific implementations and are not intended to limit the exemplary implementation of this disclosure. As used herein, the singular form is intended to include the plural form, unless the context clearly indicates otherwise. In addition, it should further be understood that terms "comprise" and/or "include" used in this specification indicate that there are features, steps, operations, devices, components, and/or combinations thereof.

As described in the background, a perforating and oxygenating device in the prior art can only supply oxygen to mushroom sticks without water injection. Water injection after perforating of the mushroom sticks will inevitably increase production cost, resulting in relatively high cost of edible mushrooms, low efficiency and relatively high labor intensity. In order to solve the above-mentioned technical problems, the present disclosure provides a perforating, oxygenating and water injection integrated apparatus for mushroom sticks of edible mushrooms.

Embodiment 1

Figure 1:
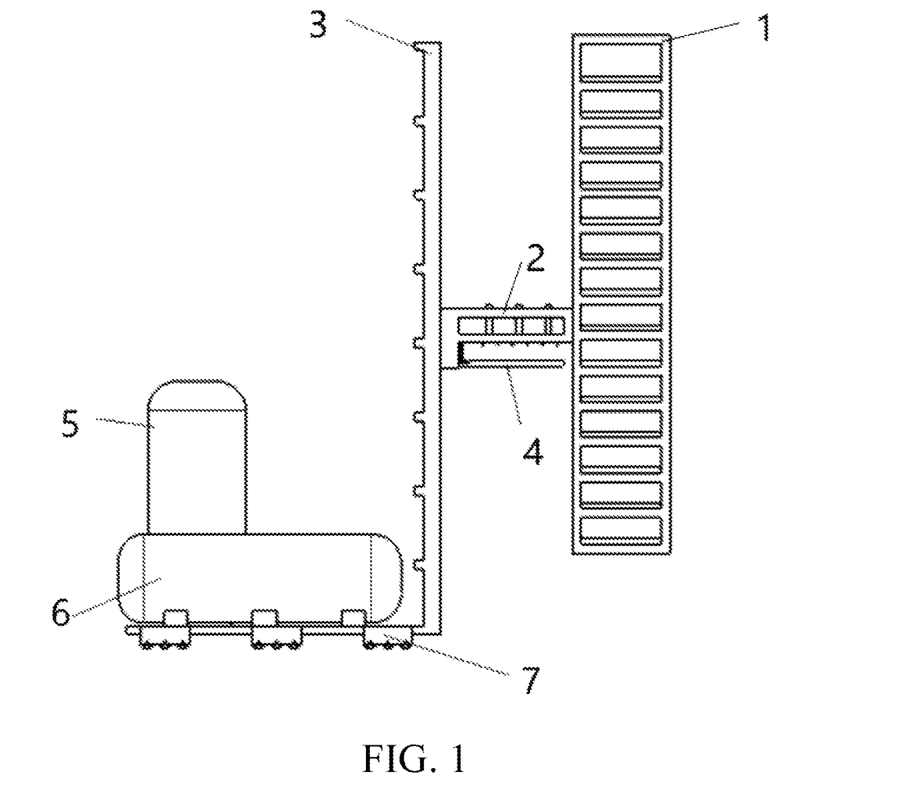
FIG. 1 is a front view of a perforating, oxygenating and water injection integrated apparatus for mushroom sticks of edible mushrooms according to one or more embodiments of the present disclosure.

In a typical embodiment of the present disclosure, referring to FIG. 1, a perforating, oxygenating and water injection integrated apparatus for mushroom sticks of edible mushrooms includes a support component 2, where the support component 2 can realize lifting motion, and the support component specifically may be a truss.

A perforating, oxygenating and water injection component is installed at the upper half part of the support component 2, where the perforating, oxygenating and water injection component is provided with a needle head fastener 9, the needle head fastener 9 is connected to the support component 2 via lifting pieces, a plurality of hollow needle heads 10 are fastened to the needle head fastener 9, and the needle heads 10 are respectively in communication with a water supply pipeline and an oxygen supply pipeline, with three functions: perforating, oxygenating and water injection.

Figure 2:
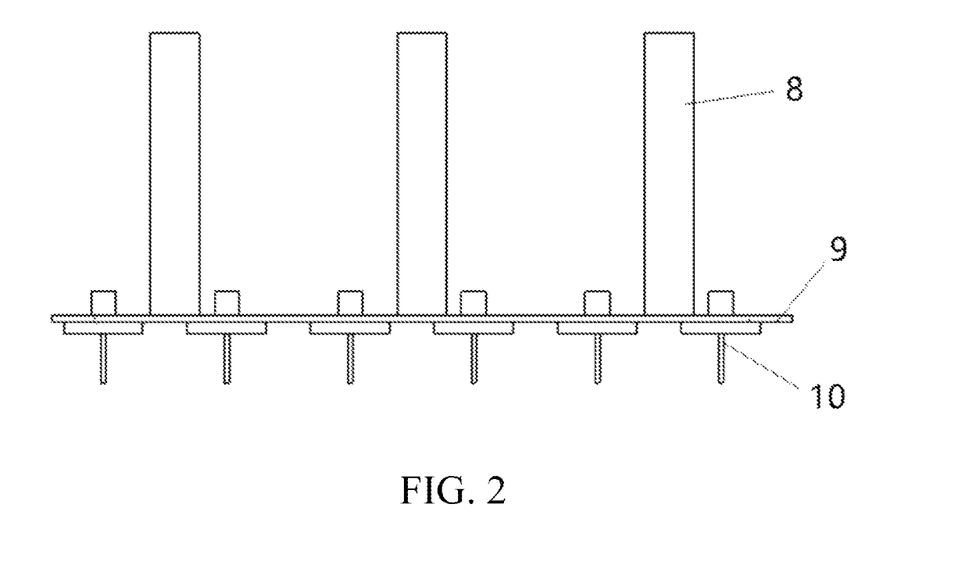
FIG. 2 is a schematic diagram of a perforating, oxygenating and water injection component of a perforating, oxygenating and water injection integrated apparatus for mushroom sticks of edible mushrooms according to one or more embodiments of the present disclosure.
Figure 3:
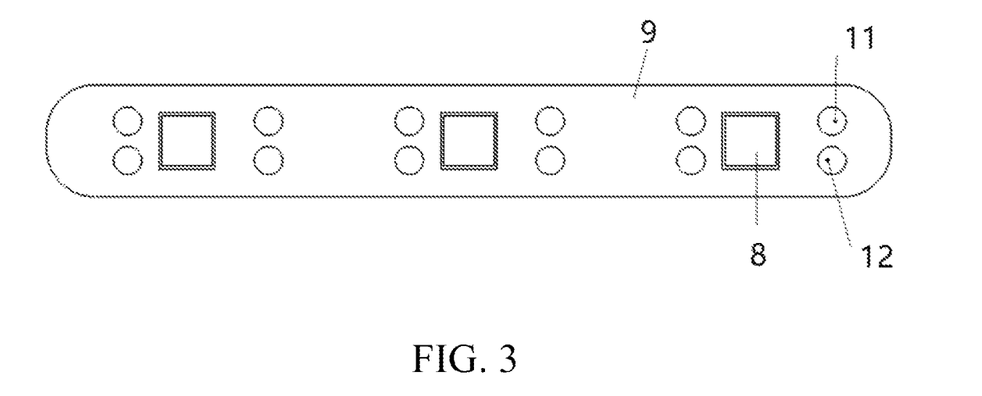
FIG. 3 is a top view of a perforating, oxygenating and water injection component of a perforating, oxygenating and water injection integrated apparatus for mushroom sticks of edible mushrooms according to one or more embodiments of the present disclosure.

As shown in FIG. 2 and FIG. 3, the needle head fastener 9 specifically is a needle head fastening plate. The lifting pieces are electric telescoping sleeves 8, and the electric telescoping sleeves are square sleeves and uniformly arranged on the needle head fastener 9. One end of the electric telescoping sleeve is connected to the upper half part of the support component 2 for fastening, and the other end is connected to the needle head fastening plate. The electric telescoping sleeves expand and contract to realize up-down motion of the needle head fastener 9. The perforating, oxygenating and water injection component drives the hollow needle heads 10 on the needle head fastening plate via the telescoping sleeves 8 to realize lifting motion, and thus the needle heads 10 enter and leave the mushroom sticks. Around the needle head 10, an oxygen supply pipeline interface 11 and a water supply pipeline interface 12 are arranged on the needle head fastener 9, and the needle head 10 respectively realizes communication with the oxygen supply pipeline and the water supply pipeline via the interfaces.

The top end of the needle head fastener is connected to telescoping sleeves 8, the plurality of needle heads 10 are arranged at the bottom of the needle head fastener, the distances between every two needle heads are the same, and water injection and oxygenating are performed by the plurality of needle heads on the same mushroom stick.

It is understood that the oxygen supply pipeline interfaces 11 and the water supply pipeline interfaces 12 are also arranged around the electric telescoping sleeves 8, and two oxygen supply pipeline interfaces 11 and two water supply pipeline interfaces 12 are respectively arranged around one electric telescoping sleeve 8. The oxygen supply pipeline interface 11 and the water supply pipeline interface 12 on the same side of the electric telescoping sleeve 8 are in communication with the needle head 10 on the same side of the electric telescoping sleeve 8. The oxygen supply pipeline interface 11 is configured to be connected to the oxygen supply pipeline. The water supply pipeline interface 12 is configured to be connected to the water supply pipeline. Specifically, the water supply pipeline is in communication with a water storage tank 5, and the air supply pipeline is in communication with an air storage tank 6, for respectively supplying water and oxygen to the perforating, oxygenating and water injection component.

The water supply pipeline and the air supply pipeline are respectively provided with a switching valve, and the switching valve is connected to the control component.

Mushroom stick support frames 4 are installed at the lower half part of the support component, and the mushroom stick support frames can realize traverse telescoping motion relative to the support component. Mushroom stick grabbing components 15 are fastened to the middle part of the support component. A mushroom stick grabbing component support frame 19 is installed at the middle part, that is a middle beam, of the support component 2. The mushroom stick grabbing components are arranged above the mushroom stick support frames 4, and the mushroom stick grabbing components 15 are arranged below the perforating, oxygenating and water injection component.

The mushroom stick grabbing component 15 includes a grabbing mechanism, and the grabbing mechanism grabs the mushroom stick to the mushroom stick support frame 4 and then releases, so that support to the mushroom stick is realized by two sleeves, that is, two sleeves 20 are arranged below each mushroom stick grabbing component.

The mushroom stick support frame 4 of this embodiment includes two telescoping sleeves 20. The two sleeves 20 are spaced from each other by a set distance. The sleeves 20 respectively are electric telescoping sleeves. The mushroom stick support frame is installed at the lower half part of the support component 2 via the two sleeves.

The support component 2 is installed on the fastening frame 3 via sliding rails 13. The support component 2 is connected to a lifting mechanism. The lifting mechanism can drive the support component 2 to realize lifting motion. The lifting mechanism is fastened to the fastening frame 3. Wheels 7 are installed at the bottom end of the fastening frame 3. The wheels 7 cooperate with tracks fastened on the ground to move along the tracks. Therefore, under the driving of the fastening frame 3, the support component 2 moves to a mushroom stick shelf 1, and the lifting mechanism ensures that the support component can realize the lifting motion.

The support component 2 can move up and down via the lifting mechanism, and can drive the perforating, oxygenating and water injection component and the like installed thereon to move together to each layer of the mushroom stick shelf 1. The mushroom stick grabbing components 15 grab the mushroom sticks from the mushroom stick shelf 1 to the mushroom stick support frames 4. The mushroom stick support frames 4 are configured to support the mushroom sticks during the process of perforating the mushroom sticks. The perforating, oxygenating and water injection component performs perforating, oxygenating and water injection on each layer of mushroom sticks. Therefore, the work efficiency is effectively improved, the production cost is improved, the problem that an existing perforating and oxygenating device can only supply oxygen to the mushroom sticks without water injection is solved, direct water injection can be realized while the needle heads perform perforating, with no need to perform water injection after perforating is completed, and perforating and water injection are integrated in one step, thereby reducing the cost of the edible mushrooms.

Figure 4:
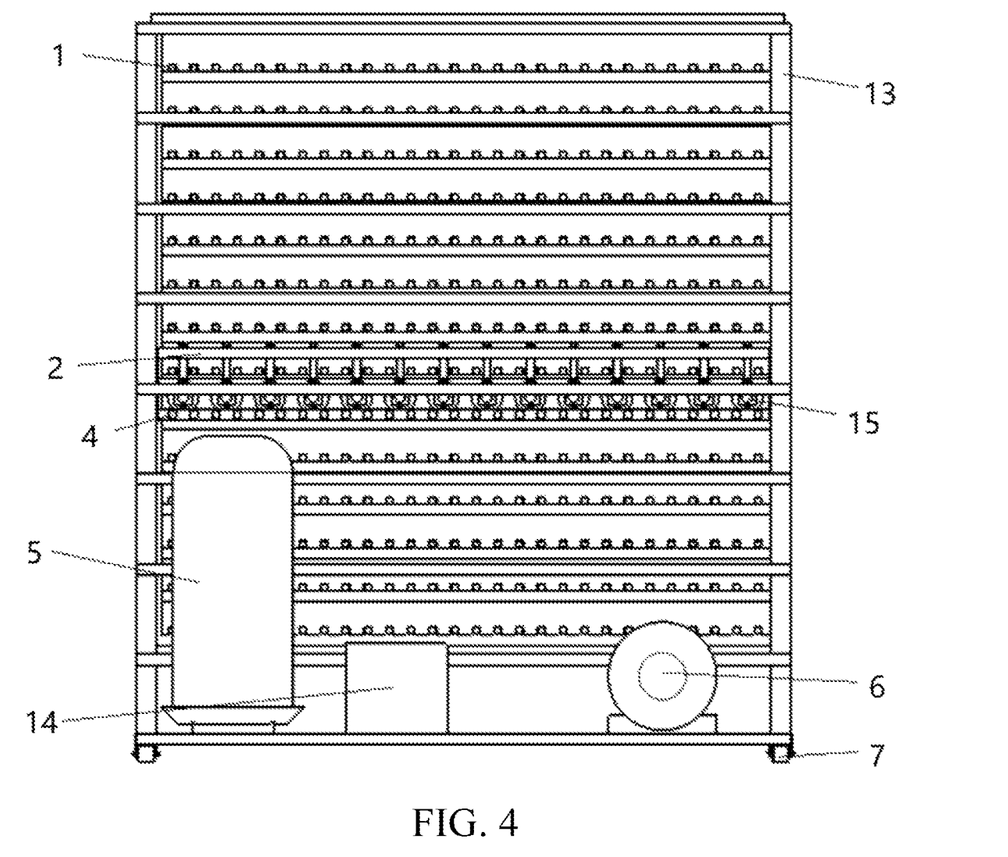
FIG. 4 is a side view of a perforating, oxygenating and water injection integrated apparatus for mushroom sticks of edible mushrooms according to one or more embodiments of the present disclosure.

Referring to FIG. 1 and FIG. 4, the fastening frame is L-shaped, a vertical part of the fastening frame is configured to move the support component up and down, and the wheels 7 are arranged at the bottom of a transverse part of the fastening frame. The water storage tank 5 and the air storage tank 6 are placed at the upper part of the fastening frame. A control box 14 is arranged between the water storage tank 5 and the air storage tank 6. The water storage tank 5 and the air storage tank 6 are respectively provided with a flowmeter. The control component is arranged in the control box, and flow of the water storage tank 5 and the air storage tank 6 are controlled in real time via the control component. When the needle heads 10 enter the mushroom sticks, the water supply pipeline is opened at first, the control box 14 for intelligent water supply and oxygen supply controls water injection, then the water supply pipeline is closed; and the oxygen supply pipeline is opened for supplying oxygen and water that is in the needle heads 10 and that does not completely enter the mushroom sticks is extruded out, so as to ensure that no water exists in the needle heads after each water injection operation.

Figure 5:
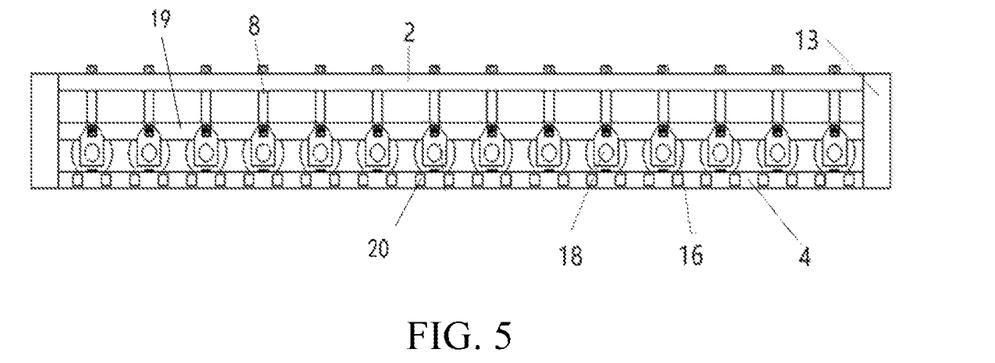
FIG. 5 is a schematic diagram of a mushroom stick grabbing component of a perforating, oxygenating and water injection integrated apparatus for mushroom sticks of edible mushrooms according to one or more embodiments of the present disclosure.
Figure 6:
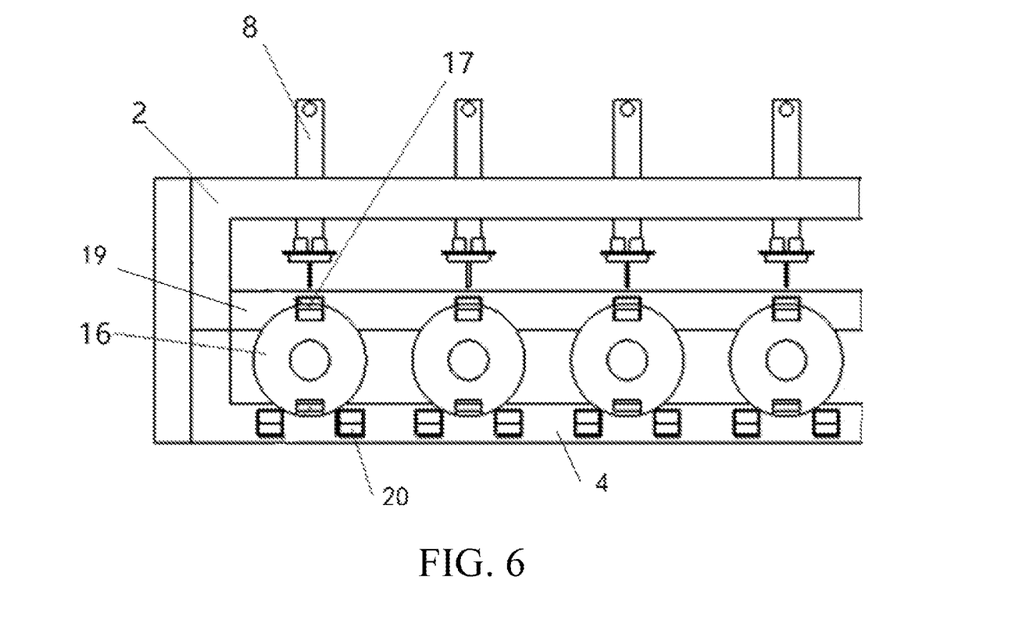
FIG. 6 is a schematic diagram of a partial structure of the mushroom stick grabbing component of FIG. 5.

Referring to FIG. 5 and FIG. 6, the grabbing mechanism includes a telescoping shaft 18. A disc 16 is fastened to one end of the telescoping shaft 18. Clamping grooves are respectively provided on two sides of the disc 16. A clamping block 17 that can move along the clamping groove is arranged at each clamping groove. The clamping blocks 17 are connected to a driving power source, the driving power source drives the two clamping blocks 17 to realize motion in the same direction or opposite directions, and thus the two clamping blocks 17 clamp or release the mushroom stick via the motion in the same direction or opposite directions.

The driving power source is fastened to a mushroom stick grabbing component support frame 19. The driving power source specifically may be a driving electric actuator, or the clamping blocks can be connected to other driving power source, as long as linear motion of the clamping blocks can be realized.

Considering that the 4 to 6 times of perforating, water injection and oxygenating need to be performed on one mushroom stick, the telescoping shaft 18 is further connected to a rotation power source. The rotation power source is fastened to the mushroom stick grabbing component support frame 19, to drive rotation of the disc 16. Through rotation of the grabbing mechanism, rotation of the mushroom stick on the support component 2 is realized, thereby facilitating uniformity of perforating, oxygenating and water injection, reducing work intensity, and improving the automatic level of mushroom stick cultivation.

In some examples, the rotation power source specifically is a rotating motor, and the rotating motor drives rotation of the telescoping shaft, and thus drives rotation of the disc.

In this embodiment, the telescoping shaft 18 is an electric telescoping shaft, and due to arrangement of the telescoping shaft, the grabbing mechanism can move towards the support component.

It is understood that there are the plurality of perforating, water injection and oxygenating components, the quantity of the plurality of perforating, water injection and oxygenating components may be the same as that of the mushroom stick shelfs, and the positions of the plurality of perforating, water injection and oxygenating components correspond to those of the mushroom stick shelfs. The position of the perforating, water injection and oxygenating component correspond to those of the mushroom stick grabbing components and the mushroom stick support frames 4, thereby realizing simultaneous operation on the plurality of mushroom sticks on the same layer of the mushroom stick shelf 1.

This embodiment further includes a control component. The control component is separately connected to the perforating, oxygenating and water injection component, the lifting pieces, the telescoping sleeves of the mushroom stick support frames 4, and the driving electric actuators, the rotating motors and the telescoping shafts of the mushroom stick grabbing components 15, thereby realizing electric control.

Specifically, the control component is a PLC controller, or other type of controller, and the control component is arranged in the control box 14.

Embodiment 2

The present disclosure further provides a working method of a perforating, oxygenating and water injection integrated apparatus for mushroom sticks of edible mushrooms, including:

A support component 2 moves to a mushroom stick shelf 1 via wheels 7 on a fastening frame 3.

A lifting mechanism drives the support component 2 to move along sliding rails 13, the support component 2 is adjusted to a suitable height, and under the driving of electric telescoping sleeves, mushroom stick support frames 4 on the support component 2 expand towards the mushroom stick shelf 1 by a set distance.

A driving power source acts, grabbing mechanisms of mushroom stick grabbing components 15 grab the mushroom sticks from the mushroom stick shelf via clamping blocks 17, and move the mushroom sticks to the upper sides of the mushroom stick support frames 4, and the grabbing mechanisms release the mushroom sticks, so that the mushroom sticks fall and are supported by the mushroom stick support frames 4.

The mushroom stick support frames 4 contract, and electric telescoping sleeves 8 on the needle head fastening plate complete vertical up-down motion of the needle heads via vertical motion. Under the driving of lifting pieces, a perforating, oxygenating and water injection component drive needle heads 10 to enter the mushroom sticks, to perform water injection on the mushroom sticks, and to perform oxygenating after water injection. A rotation power source acts, and 4-6 times of perforating, oxygenating and water injection are performed. After last oxygenating is completed, the lifting pieces drive the needle heads to leave the mushroom sticks.

The foregoing descriptions are merely preferred embodiments of this disclosure, but are not intended to limit this disclosure. A person skilled in the art may make various modifications and changes to this disclosure. Any modification, equivalent replacement, or improvement made without departing from the spirit and principle of this disclosure shall fall within the protection scope of this disclosure.

What is claimed is:

1. A perforating, oxygenating and water injection integrated apparatus for mushroom sticks of edible mushrooms, the perforating, oxygenating and water injection integrated apparatus comprising:
   a support component, the support component being capable of realizing lifting motion;
   a perforating, oxygenating and water injection component, installed on the support component, where the perforating, oxygenating and water injection component comprises a needle head fastener, the needle head fastener is connected to the support component via lifting pieces, a plurality of hollow needle heads are fastened to the needle head fastener, and the needle heads are respectively in communication with a water supply pipeline and an oxygen supply pipeline;
   mushroom stick support frames, installed on the support component, wherein the mushroom stick support frames can expand and contract relative to the support component, and the mushroom stick support frames are located below the perforating, oxygenating and water injection component;
   mushroom stick grabbing components, fastened to the support component, where the mushroom stick grabbing component comprises a grabbing mechanism, and the grabbing mechanism releases after grabbing the mushroom stick to the mushroom stick support frame,
   wherein the support component is installed on the fastening frame via sliding rails, the support component is connected to a lifting mechanism, the lifting mechanism drives the support component to realize lifting motion, and the lifting mechanism is fastened to the fastening frame; and
   wheels are installed at the bottom end of the fastening frame, and the wheels cooperate with tracks fastened on the ground to move along the tracks.

2. The perforating, oxygenating and water injection integrated apparatus for mushroom sticks of edible mushrooms according to claim 1, wherein the needle head fastener is a needle head fastening plate; and
   the lifting piece is an electric telescoping sleeve, one end of the electric telescoping sleeve is connected to the support component, and the other end is connected to the needle head fastening plate.

3. The perforating, oxygenating and water injection integrated apparatus for mushroom sticks of edible mushrooms according to claim 1, wherein the grabbing mechanism comprises a telescoping shaft, a disc is fastened to one end of the telescoping shaft, clamping grooves are respectively provided on two sides of the disc, a clamping block that can move along the clamping groove is arranged at each clamping groove, the clamping blocks are connected to a driving power source, and the driving power source drives the two clamping blocks to realize motion in the same direction or opposite directions.

4. The perforating, oxygenating and water injection integrated apparatus for mushroom sticks of edible mushrooms according to claim 3, wherein the telescoping shaft is connected to a rotation power source to drive rotation of the disc, and
   the telescoping shaft is an electric telescoping shaft.

5. The perforating, oxygenating and water injection integrated apparatus for mushroom sticks of edible mushrooms according to claim 1, wherein the mushroom stick grabbing component is arranged above the mushroom stick support frame, and the mushroom stick grabbing component is arranged below the perforating, oxygenating and water injection component.

6. The perforating, oxygenating and water injection integrated apparatus for mushroom sticks of edible mushrooms according to claim 1, wherein the mushroom stick support frame comprises two telescoping sleeves, the two sleeves are spaced from each other by a set distance, and the sleeves respectively are electric telescoping sleeves.

7. The perforating, oxygenating and water injection integrated apparatus for mushroom sticks of edible mushrooms according to claim 1, comprising a plurality of perforating, oxygenating and water injection components including the perforating, oxygenating and water injection component, and positions of the plurality of perforating, oxygenating and water injection components correspond to positions of the mushroom stick grabbing components and positions of the mushroom stick support frames.

8. The perforating, oxygenating and water injection integrated apparatus for mushroom sticks of edible mushrooms according to claim 1, further comprising a control component, wherein the control component is separately connected to the perforating, oxygenating and water injection component, the lifting pieces, the mushroom stick support frames and the mushroom stick grabbing components.

9. A working method of the perforating, oxygenating and water injection integrated apparatus for mushroom sticks of edible mushrooms according to claim 1, the working method comprising:
   moving the support component to a mushroom stick shelf;
   expanding the mushroom stick support frames towards the mushroom stick shelf by a set distance;
   grabbing, by grabbing mechanisms of the mushroom stick grabbing components, the mushroom sticks from the mushroom stick shelf, and moving the mushroom sticks to upper sides of the mushroom stick support frames, and releasing, by the grabbing mechanisms, the mushroom sticks so that the mushroom sticks fall and are supported by the mushroom stick support frame;
   contracting the mushroom stick support frames; and
   under a driving of the lifting pieces, driving, by the perforating, oxygenating and water injection component, the needle heads to enter the mushroom sticks, to perform water injection on the mushroom sticks and then to perform oxygenating after the water injection, after the oxygenating is completed, driving, by the lifting pieces, the needle heads to leave the mushroom sticks.

* * * * *